United States Patent
Sasaki et al.

(10) Patent No.: US 7,779,172 B2
(45) Date of Patent: Aug. 17, 2010

(54) ACTIVATOR, DMA TRANSFER SYSTEM, DMA TRANSFER METHOD

(75) Inventors: Nobuo Sasaki, Kanagawa (JP); Kaoru Yamanoue, Tokyo (JP); Yoshikazu Takahashi, Saitama (JP); Shinichi Honda, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 69 days.

(21) Appl. No.: 11/515,396

(22) Filed: Sep. 1, 2006

(65) Prior Publication Data

US 2007/0130381 A1    Jun. 7, 2007

(30) Foreign Application Priority Data

Nov. 7, 2005    (JP)    ............... 2005-322278

(51) Int. Cl.
G06F 13/28    (2006.01)
G06F 15/167    (2006.01)
(52) U.S. Cl. .................. 710/22; 709/212
(58) Field of Classification Search .......... 710/22
See application file for complete search history.

(56) References Cited

U.S. PATENT DOCUMENTS 5,850,529 A * 12/1998 Nakamura .............. 710/108
5,948,080 A * 9/1999 Baker .................... 710/37
6,202,107 B1 * 3/2001 Collier .................. 710/22
6,654,819 B1 * 11/2003 Comisky et al. ........ 710/22

FOREIGN PATENT DOCUMENTS

JP    2005-202767    7/2005

OTHER PUBLICATIONS

Notification of Reason(s) for Refusal dated Aug. 18, 2009, from the corresponding Japanese Application.

* cited by examiner

*Primary Examiner*—Henry W. H. Tsai
*Assistant Examiner*—Juanito C Borromeo
(74) *Attorney, Agent, or Firm*—Katten Muchin Rosenman LLP (57) ABSTRACT

A DMA controller controls DMA transfer in an information processing system. Input and output devices are a transfer source or a transfer destination in DMA transfer and request DMA transfer. A DMAC activating unit is provided with an event monitoring unit and an event register. The event register registers an event subject to monitoring. The event monitoring unit detects an event generated in the input and output devices and determines whether the detected event matches an event registered in the event register. If it is determined that the events match, the event monitoring unit activates the DMA controller.

13 Claims, 8 Drawing Sheets

ACTIVATOR, DMA TRANSFER SYSTEM, DMA TRANSFER METHOD

BACKGROUND OF THE INVENTION

1. Field of the Invention

The present invention relates to a data transfer technology using DMA.

2. Description of the Related Art

One of the requirements in a multimedia terminal such as a gaming device is to read and write image data and/or audio data frequently. In order to reduce a load imposed on a central processing unit (CPU), data transfer between a memory and an external input and output device is often carried out by using Direct Memory Access (DMA). DMA transfer is a method to transfer data at a high speed between a memory and an input and output device without CPU intervention.

In a system in which DMA transfer is implemented using an interrupt, two interrupts to a CPU is usually generated for a single transfer process. That is, an interrupt is generated when there is a request for DMA transfer from an input and output device and when the DMA transfer is completed. When an interrupt to a CPU is generated, the CPU should handle the interrupt. Therefore, the more frequent the interrupts, the heavier the load on the CPU.

SUMMARY OF THE INVENTION

In this background, a general purpose of the present invention is to provide a data transfer technology capable of reducing a load imposed on a CPU by reducing the frequency of interrupts.

One embodiment of the present invention relates to acquiring an event generated in a computer system, comparing the acquired event with a pre-registered event and activating a direct memory access controller for controlling data transfer between a peripheral device and a storage device, if the events match.

The term "event" refers to generation or completion of any process in a peripheral device, a storage device or a DMA controller. This embodiment enables event-based selection of one of DMA requests generated in a computer system. Therefore, a desired DMA process can be started without CPU intervention.

Another embodiment of the present invention relates to performing continuous DMA transfer of mutually related multiple data blocks. In this method, information on the multiple data blocks is stored in the DMA controller. Completion of DMA transfer of a data block activated in response to the generation of a first event is registered as a second event for activating DMA transfer of a data block to be subsequently transferred.

According to the inventive event-driven activation of DMA transfer, completion of a DMA transfer cycle is registered as an event for activating another DMA transfer cycle. Accordingly, continuous data transfer can be implemented without CPU intervention.

Substitution of constituting elements and various implementations of the invention in the form of methods, systems computer programs, recording mediums storing computer programs, etc. may also be practiced as additional modes of the present invention.

DETAILED DESCRIPTION OF THE INVENTION

A brief overview of the related-art DMA transfer method will first be described and then the features of the present invention will be explained.

DMA transfer is for data transfer without the intervention of a CPU, which performs overall control of a computer, and is often used in the related art for high-speed data transfer between a main memory and various input and output devices. Normally, the following steps are performed in DMA transfer. When a request for DMA transfer is issued by an input and output device, an interrupt is sent to a CPU so that an interrupt handler is invoked. The interrupt handler sets up information necessary for DMA transfer in a DMA controller. For example, an address of a transfer source device, an address of a transfer destination device, the number of bytes of data to be transferred and the like are set up. When the DMA controller issues a bus request to a bus arbiter and the CPU kicks the DMA controller subsequently, the DMA controller occupies an address bus and a data bus so as to start DMA transfer control. When the DMA transfer is completed, an interrupt is sent to the CPU again and new data is prepared in the main memory. By performing the above steps repeatedly, the DMA controller controls data transfer between the main memory and the device.

The above-mentioned method, however, requires frequent interrupts to the CPU, lowering the processing efficiency of the CPU.

In this background, we have arrived at an approach whereby processing efficiency is improved by reducing the frequency of interrupts to the CPU in performing DMA transfer. A detailed description of the present invention will now be given by referring to several embodiments.

First Embodiment

Figure 1:
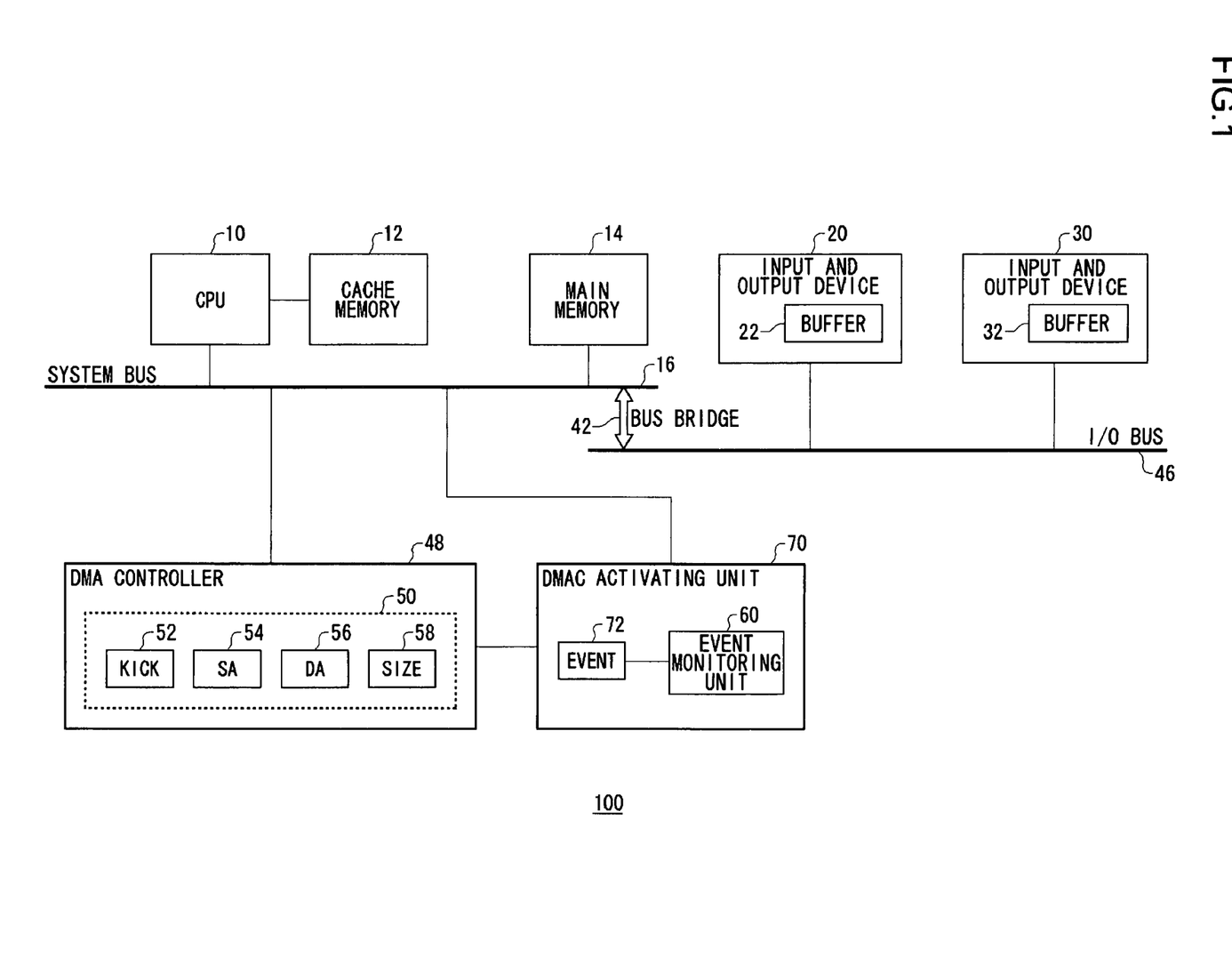
FIG. 1 shows the hardware structure of an information processing system according to a first embodiment of the present invention.

FIG. 1 shows the hardware structure of an information processing system 100 according to a first embodiment of the present invention. The information processing system 100 is provided with a main CPU 10, a main memory 14, a DMA controller 48 and a DMA controller activator (hereinafter, referred to as "DMAC activating unit") 70. These components are connected to each other via a system bus 16.

The CPU 10 controls the whole of the information processing system 100 and performs various process in accordance with a program loaded into the main memory 14 from an external storage device or a recording medium. The main memory 14 appropriately stores data required by the CPU in performing the various processes.

Examples of the input and output devices 20, 30 include an output device such as a display, an external storage device such as a hard disk drive, a communication device such as a modem or a terminal adaptor (TA), a TV tuner and a printer. The input and output device may also be a drive using a removable recording medium such as an optical disk, a magneto-optical disk and a semiconductor memory. The communication device performs communication with, for example, another information processing system via a network exemplified by the Internet.

The input and output devices 20, 30 are connected to the system via an I/O bus 46. A bus bridge 42 which functions as a transceiver is placed between the system bus 16 and the I/O bus 46.

The input and output devices 20, 30 are each provided with a coprocessor (not shown) for managing data input and output and are also provided with buffers 22 and 32, respectively. Data is transferred between the main memory 14 and the buffers for read and write operations. While FIG. 1 depicts two input and output devices, there may be only one input and output device or, alternatively, three or more input and output devices.

In the information processing system 100, the DMA controller 48 connected to the CPU 10 by a high-speed link controls the operation of the bus bridge 42. The arbiter (not shown) grants bus right to the CPU 10, the DMA controller 48 or other bus masters on the system bus 16. The DMA controller 48 controls DMA transfer on the same bus as the CPU 10 such that direct data transfer is performed between the input and output devices 20, 30 and storage devices such as memories without the intervention of the CPU 10.

The DMA controller 48 is provided with a register set 50 comprising a control register (denoted as "KICK" in the figure) 52, a transfer source address register (denoted as "SA" in the figure) 54, a transfer destination address register (denoted as "DA" in the figure) 56 and a size register (denoted as "SIZE" in the figure) 58.

The control register 52 is a register for storing a configuration value for controlling the DMA controller 48. By setting up a start bit in the control register, the DMA controller 48 is activated. The address of a data transfer source (source address) is set up in the transfer source address register 54. The address of a data transfer destination (destination address) is set up in the transfer destination address register 56. The addresses are incremented each time data is transferred. The transfer data size is set up in the size register 58 and a transfer count is decremented each time data is transferred.

The CPU 10 sets up a transfer source address in the transfer source address register 54 in the DMA controller 48, sets up a transfer destination address in the transfer destination address register 56 and sets up a data size in the size register 58. After the data are set up, a start bit is set up in the control register 52 in the DMA controller 48, which activates the DMA controller 48.

The DMA controller 48 transfers data from a transfer source to a transfer destination in accordance with the addresses set up. When the DMA controller 48 outputs the transfer source address to the address bus and outputs a read signal, data stored in the transfer source address is output from the transfer source device to the data bus. Subsequently, when the DMA controller 48 outputs the transfer destination address to the address bus and outputs a write signal, data on the data bus is written in the transfer destination address of the transfer destination device. Each time data is transferred, the transfer source address and the transfer destination address are incremented, while the data size is decremented by an amount equal to the transfer count. When the remaining data size is zero, an interrupt is sent to the CPU 10.

The output devices 20, 30, which are a transfer source or a transfer destination of DMA transfer, send an event notification signal indicating the generation of an event to the DMAC activating unit 70 via the bus. The input and output device notifies the DMAC activating unit 70 of the completion of DMA transfer, which is controlled by the DMA controller 48, as an event. An event is described by using a symbol identifying the input and output device and a symbol indicating the content of the event.

The DMAC activating unit 70 includes an event monitoring unit 60 and an event register (indicated as "EVENT" in the figure) 72. Events to be responded to are registered in the event register 72. The event monitoring unit 60 receives an event notification signal from the input and output devices 20, 30 so as to select a device to respond to for DMA transfer. More specifically, the event monitoring unit 60 compares an event communicated from the input and output device with an event registered in the event register 72. If the events match, the DMA controller 48 is activated.

According to another example, the event monitoring unit 60 may be notified of an event that is generated in the input and output device via a dedicated line connecting the input and output devices 20, 30 with the DMAC activating unit 70. The dedicated line may be shared by all the input and output devices and may be hard-wired to open drains.

Figure 2:
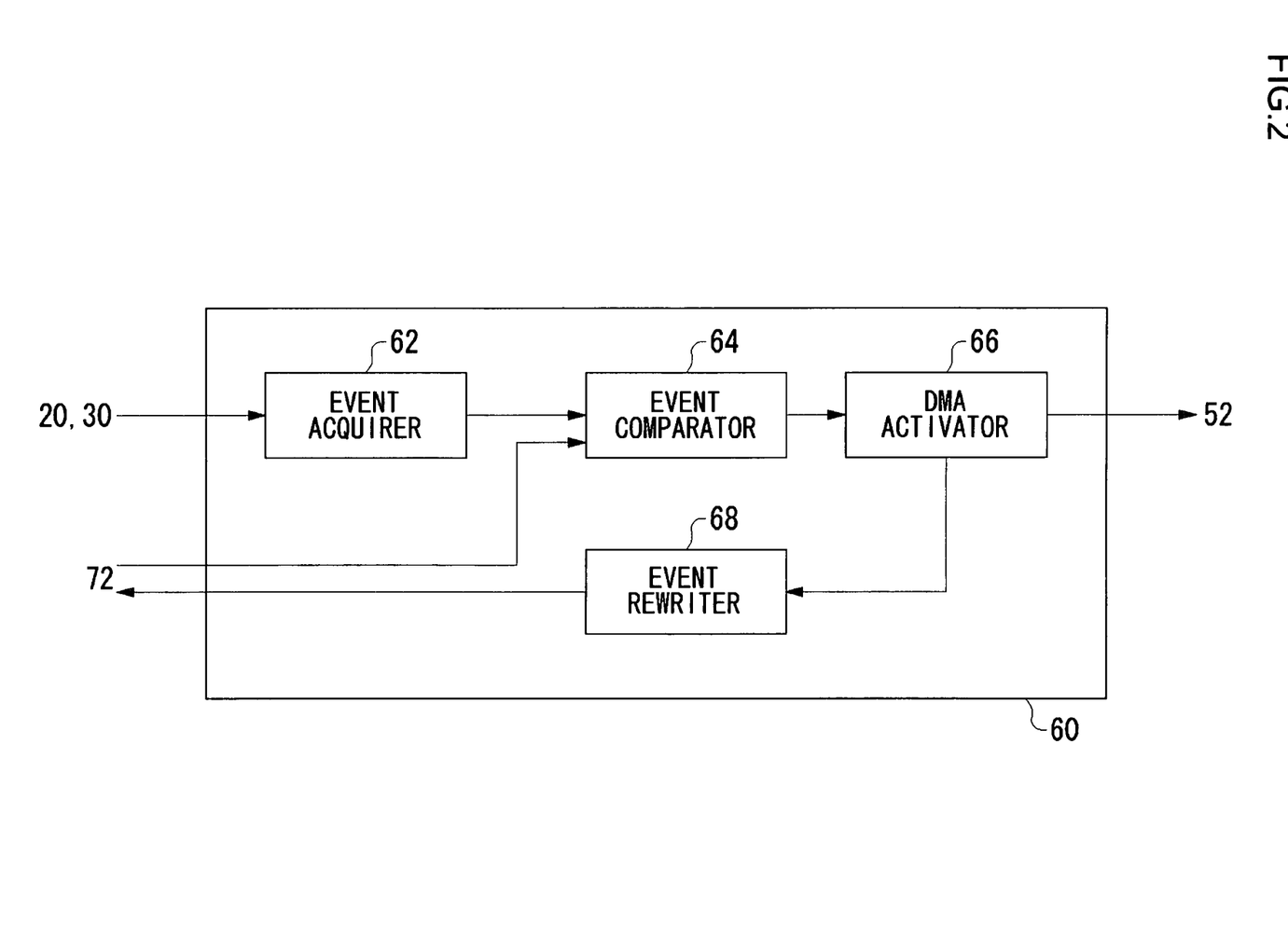
FIG. 2 is a functional block diagram of a DMAC activating unit.

FIG. 2 is a detailed block diagram showing the event monitoring unit 60 of FIG. 1. The event monitoring unit 60 includes an event acquirer 62, an event comparator 64, a DMA activator 66 and an event rewriter 68.

The event acquirer 62 receives an event notification signal sent from the input and output devices 20, 30. The event comparator 64 determines whether an event defined in the event register 72 matches the event received. If the events match, the DMA activator 66 activates the DMA controller 48 by setting up a start bit in the control register 52 of the DMA controller 48. The event rewriter 68 rewrites the content of the event register 72 if a certain condition is fulfilled.

In this embodiment, the input and output devices 20, 30 notify the event monitoring unit 60 of an event. In response to this, the event monitoring unit 60, instead of the CPU 10, activates the DMA controller 48. Thus, DMA transfer can start without the intervention of the CPU 10.

For example, if DMA transfer to and from a specific input and output device is permitted, the CPU 10 registers an event related to that input and output device in the event register 72 before the DMA transfer is generated. When the input and output devices 20, 30 notify the event monitoring unit 60 of an event, the event monitoring unit 60 determines whether to respond to the event. If the event monitoring unit 60 determines to respond, it activates the DMA controller 48. If the event monitoring unit 60 determined not to respond, it disregards the event. When the DMA transfer is complete, the DMA controller 48 notifies the CPU 10 of the completion of transfer. Thus, by registering an event corresponding to an input and output device for which DMA transfer should be permitted in the event register 72 of the DMAC activating unit 70 before the DMA transfer is generated, and by registering information such as addresses required in the DMA transfer, in the register set 50 of the DMA controller 48, the CPU 10 need not be involved in the execution of transfer and does not receive an interrupt when the transfer is started. This can successfully reduce the frequency of interrupts sent to the CPU 10 in performing DMA transfer.

Figure 3:
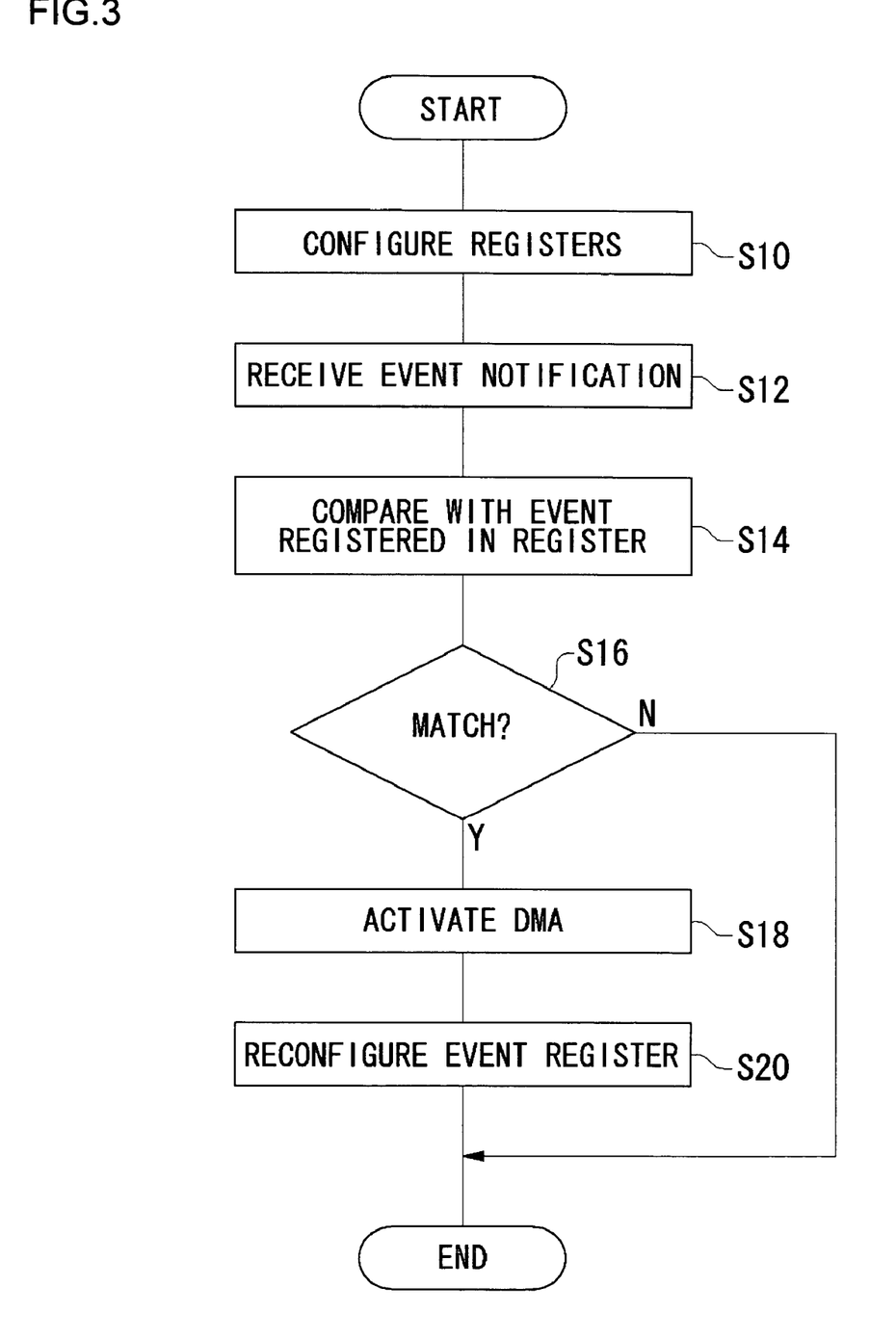
FIG. 3 is a flowchart showing a process in the DMAC activating unit.

FIG. 3 is a flowchart showing activation of the DMA controller performed by the event monitoring unit 60. It will be assumed that data to be transferred is stored in the main memory 14 or the buffers of the input and output devices 20, 30.

First, the CPU 10 sets up a transfer source address, a transfer destination address and a data size in DMA transfer in the register set 50 in the DMA controller 48. In addition, the CPU 10 sets an event for which DMA transfer is permitted in the event register 72 of the DMAC activating unit 70 (S10). For example, a buffer full (also referred to as buffer overflow) or buffer empty (buffer underflow) in the input and output device may be set up as an event.

The event acquirer 62 of the event monitoring unit 60 is then notified of an event generated in the input and output devices 20, 30 (S12). Subsequently, the event comparator 64 compares the event set up in the event register 72 with the received event (S14) so as to determine if they match (S16). If the events do not match (N in S16), the flow is terminated. If the events match (Y in S16), the DMAC activator 66 of the event monitoring unit 60 sets up a start bit in the control register 52 of the DMA controller 48 so as to kick the DMA controller (S18). The DMA controller 48 starts DMA transfer in accordance with the information set up in the register set 50. The event rewriter 68 reconfigures the event register 72 as required (S20).

When the DMA transfer is complete, a DMA completion interrupt is input to the CPU 10. The DMA completion interrupt initiates preparation of new data in the main memory 14.

As described above, by providing the function of determining whether to respond to a request for DMA transfer outside the CPU, the first embodiment ensures that the frequency of interrupts to the CPU is reduced and CPU load is reduced. This is expected to make the CPU available for processes other than the DMA transfer, thereby increasing processing efficiency of the information processing system as a whole. Reduction in CPU load can also lead to reduced power consumption.

By registering an event in an event register and comparing the registered event with the event communicated to the event monitoring unit, only those DMA transfer requests from restricted input and output devices are allowed. For example, in a configuration in which there are multiple input and output devices included in an information processing system, registration of events associated with specific input and output devices in an event register allows data to be read from and written to only those specific input and output devices. Even when an event is communicated from multiple input and output devices or when multiple events are communicated from a single input and output device, the event registered in the event register determines whether the event should be responded to and DMA transfer should be permitted. The aforementioned approach can successfully prevent unauthorized access from an external device to the main memory for extraction of data. Thus, event registration also improves security.

Input and output devices for which DMA transfer is accepted may be appropriately determined depending upon the content of process in the CPU. Events to respond to can be determined by defining the content of the event register. Therefore, an interrupt handler may be designed such that, for example, DMA transfer from an external storage device to the main memory is given priority in one situation and DMA transfer from a network communication device to the main memory is given priority in another situation. Thus, the inventive approach enhances the flexibility of application design. If there are input and output devices provided with different functions within a system, registration of events corresponding to input and output devices allows DMA transfer to be performed depending upon various situations.

Second Embodiment

FIG. 2 shows a DMAC activating unit provided with a single event register. Alternatively, the inventive method can equally deal with a case where there are multiple event registers. By combining multiple event registers and the aforementioned DMA transfer method, frequency of interrupts to the CPU in continuous data transfer can be further reduced.

Figure 4:
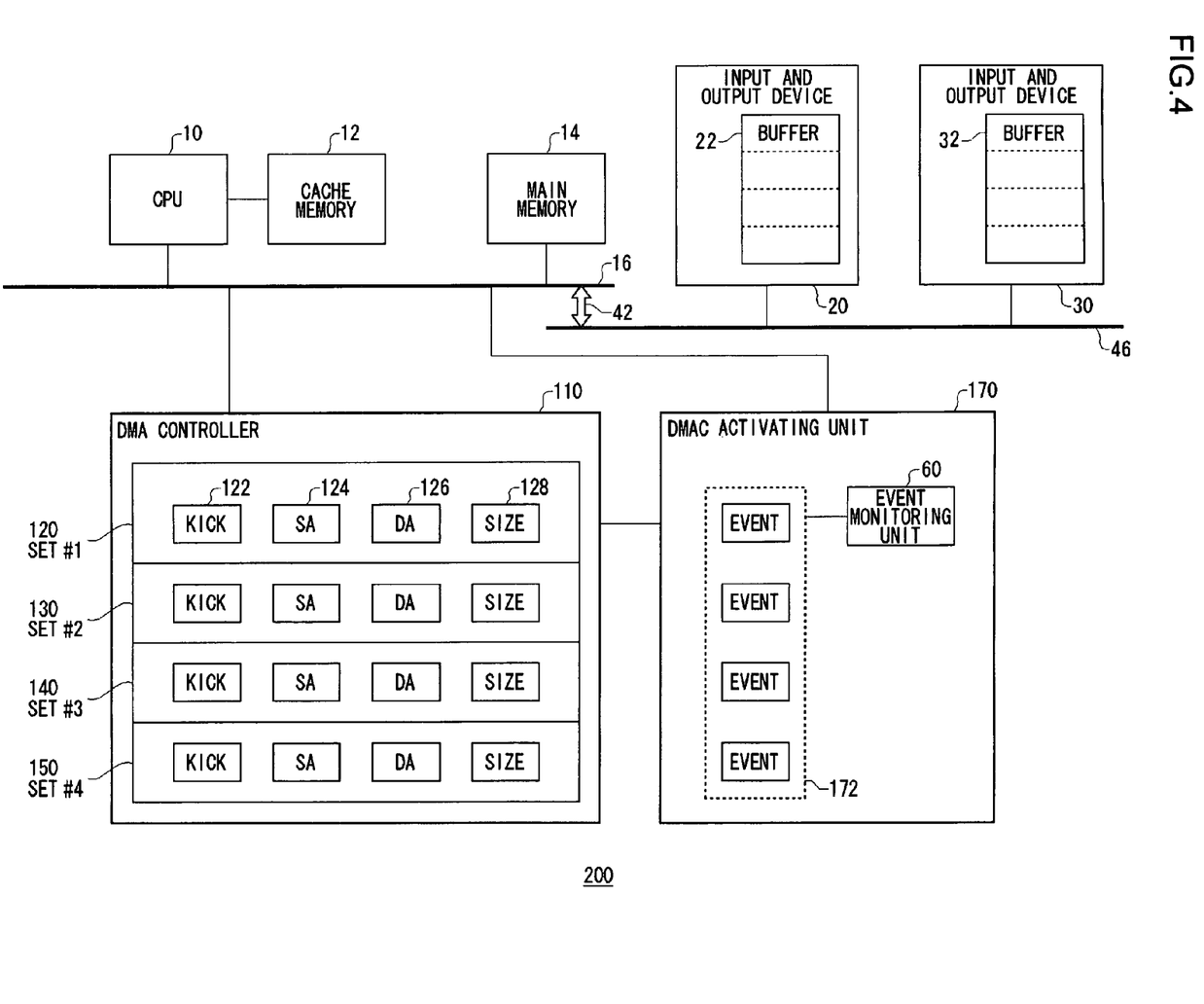
FIG. 4 shows the hardware structure of an information processing system according to a second embodiment of the present invention.

FIG. 4 shows the hardware structure of an information processing system 200 according to a second embodiment of the present invention. The CPU 10, the cache memory 12, the main memory 14 and the input and output devices 20, 30 respectively have the same functions as those of FIG. 1 so that the description there of is omitted. A DMA controller 110 controls DMA transfer in the information processing system 200. The input and output devices 20, 30 are a transfer source or a transfer destination in DMA transfer.

The DMA controller 110 is provided with multiple register sets each comprising a control register 122, a transfer source address register 124, a transfer destination address register 126 and a size register 128. FIG. 4 depicts four register sets 120, 130, 140 and 150 (hereinafter, referred to as register sets #1-4).

A DMAC activating unit 170 is provided with an event monitoring unit 60 and event registers 172, the number of event registers 172 being identical with the number of register sets in the DMA controller 110. The event registers 172 and the register sets #1-4 are associated with each other in one-to-one relationship.

Similarly to the first embodiment, the event monitoring unit 60 receives an event notification signal from the input and output devices 20, 30. The event monitoring unit 60 determines whether the received event matches an event in one of the event registers 172. The event monitoring unit 60 then identifies an event register registering the matching event. The event monitoring unit 60 then sets a start bit in the control register within the register set associated with the event register thus identified. The DMA controller 110 performs DMA transfer in accordance with the information in the register set in which the start bit is set.

By taking advantage of the multiple event registers, advanced DMA transfer control is enabled. A description will now be given of cascade transfer of data by way of example.

The related-art data transfer between a buffer of an input and output device and a main memory requires the CPU to set up a transfer source address, a transfer destination address and a transfer data size in a DMA controller. DMA transfer is initiated as the CPU kicks the DMA controller. For transfer of multiple blocks of data, the above steps should be repeated the number of times equal to the number of blocks transferred. The related-art method, however, presents a problem in that it invokes an interrupt for each block as multiple data blocks are transferred continuously, forcing the CPU to kick the DMA controller each time and increasing CPU load.

In this background, a DMA transfer method is provided and described hereinafter in which the configuration of the second information processing system 200 is taken advantage of. Data blocks can be transferred continuously in a cascade fashion without sending an interrupt to the CPU.

Figure 5:
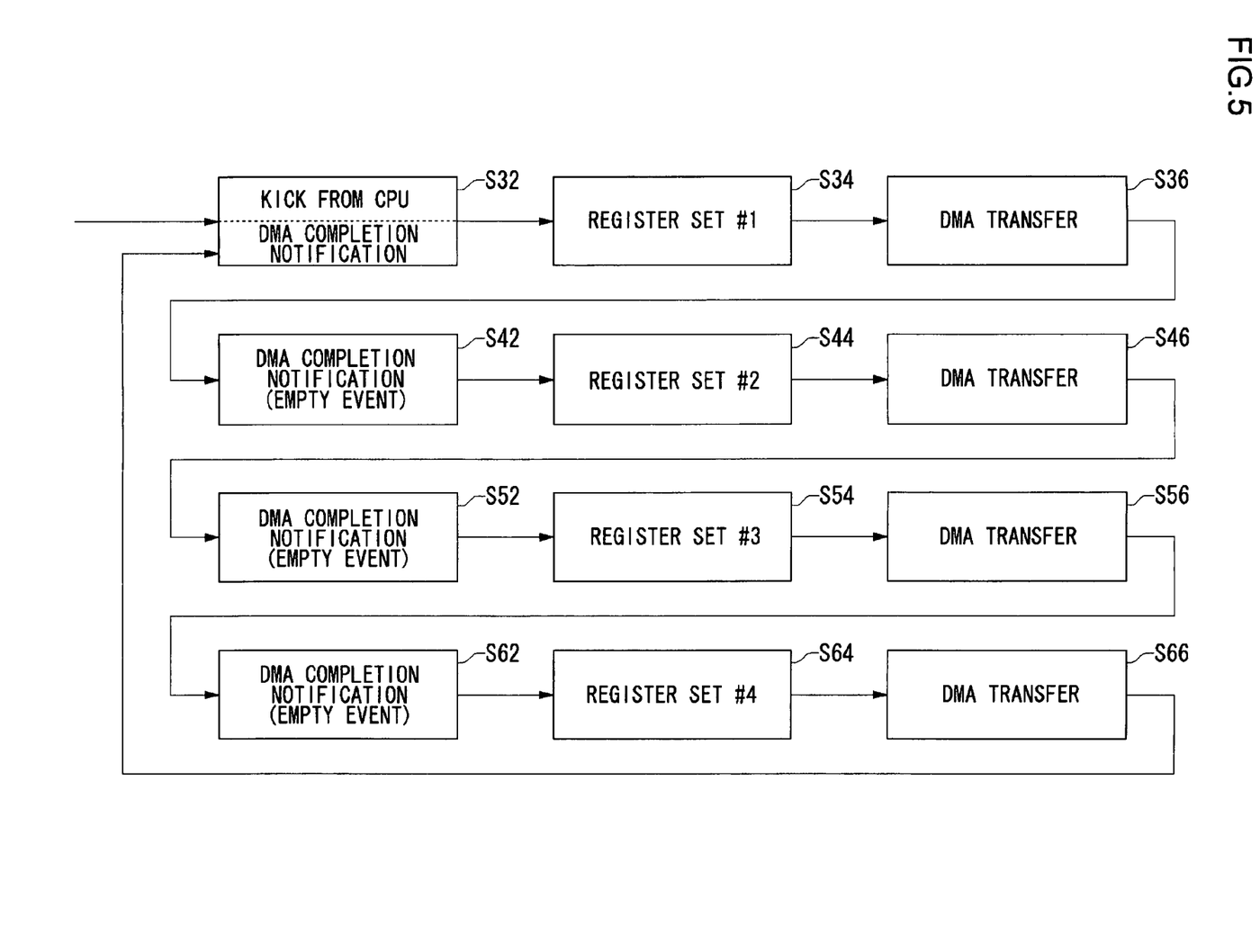
FIG. 5 shows a cascaded DMA process.

FIG. 5 shows a conceptual diagram of cascade transfer of data. A case where four data blocks are transferred continuously from a main memory to one of input and output devices will be considered. In this case, information related to the data blocks to be transmitted continuously is written in the register sets #1-4 in the DMA controller as indicating targets of DMA transfer. A DMA transfer completion event for a data block is registered in each of the four event registers in the DMAC activating unit 170 as an event for activating DMA transfer of another data block.

More specifically, the following information on data blocks 1-4 to be transferred continuously is registered in the four register sets #1-4 in the DMA controller 110.

Register set #1: transfer source address, transfer destination address and data size of data block 1

Register set #2: transfer source address, transfer destination address and data size of data block 2

Register set #3: transfer source address, transfer destination address and data size of data block 3

Register set #4: transfer source address, transfer destination address and data size of data block 4

The following events are registered in the four event registers #1-4 in the DMAC activating unit 170. The event registers #1-4 are associated with the register sets #1-4 in one-to-one relationship.

Event register #1: buffer empty of transfer destination input and output device

Event register #2: completion of DMA transfer of data block 1

Event register #3: completion of DMA transfer of data block 2

Event register #4: completion of DMA transfer of data block 3

That is, the transfer destination address, transfer source address and data size of the data block 2 to be transferred subsequent to data block 1 are registered in the second register set #2. The transfer end event for data block 1 is registered in the event register #2 associated with the second register set #2. The rest of the data blocks are similarly set up.

The above-mentioned configuration allows cascade transfer as shown in FIG. 5 to be performed.

First, when buffer empty in the transfer destination input and output device is detected (S32), the event monitoring unit 60 sets up a start bit in the control register 122 of the register set #1 in the DMA controller (S34). This prompts the DMA controller 110 to start DMA transfer in accordance with the information set up in the register set #1 (S36). When the transfer is complete, a DMA transfer completion event set up in the register set #1, i.e. a memory empty event, is communicated to the event monitoring unit 60 (S42). The event monitoring unit 60 determines that the event registered in the event register #2 matches the communicated event and sets up a start bit in the control register of the register set #2 (S44). This prompts the DMA controller 110 to start DMA transfer in accordance with the information set up in the register set #2 (S46). Similarly, when the transfer of data block 2 is completed, an event is generated (S52), information is set up in the control register of the register set #3 (S54), and data block 3 is DMA transferred (S56). When the transfer of data block 3 is complete, an event is generated (S62), information is set up in the control register of the register set #4 (S64), and data block 4 is DMA transferred (S66).

As described, the DMA controller is kicked repeatedly to effect transfer, triggered by a DMA transfer completion event for a previous data block. By registering the completion of DMA transfer as an event in the event register, it is ensured that the same number of data items as the number of register sets can be continuously DMA transferred without CPU intervention.

In S32, the CPU 10 may activate the DMA controller for transfer of the first data block, instead of allowing the event monitoring unit 60 to detect buffer empty to start DMA transfer.

Figure 6:
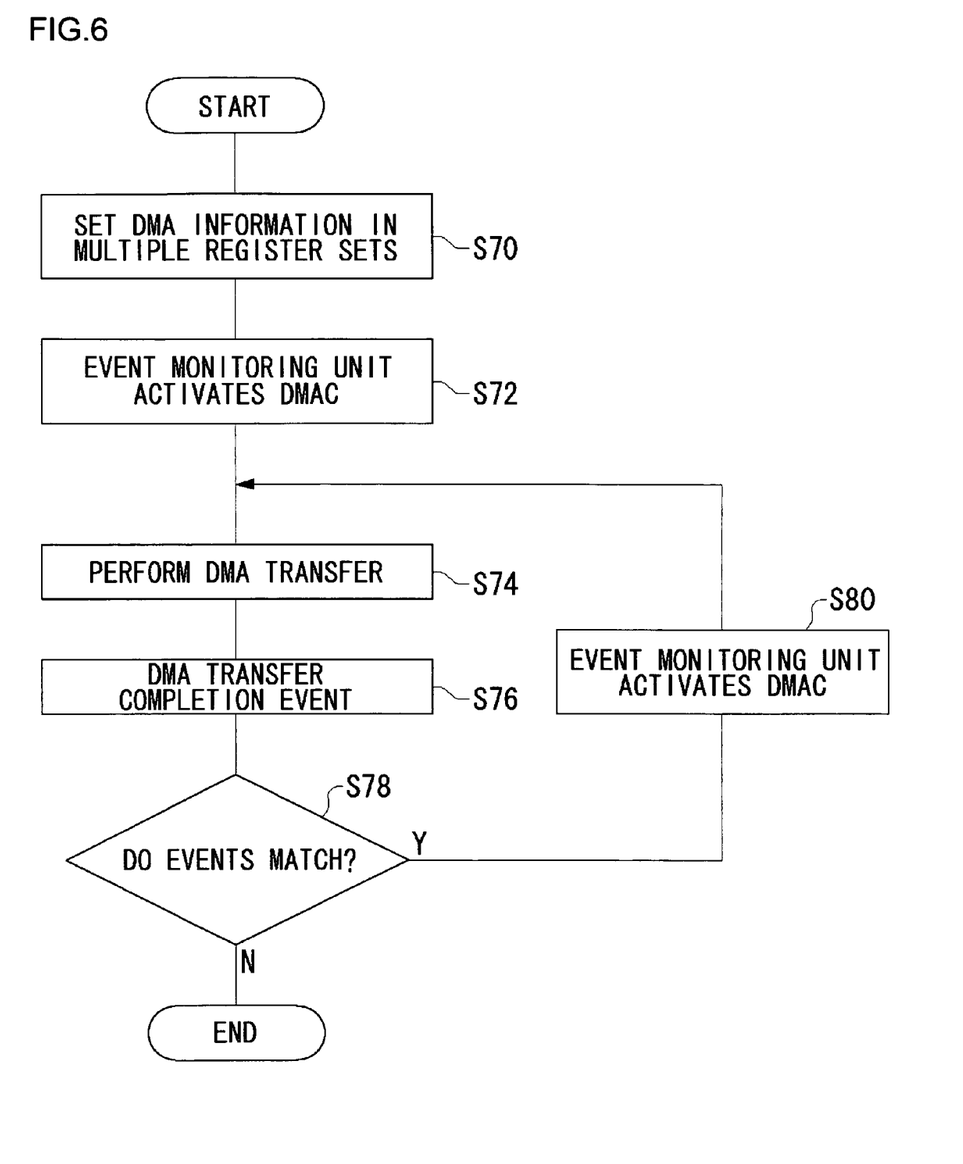
FIG. 6 is a flowchart showing a process in the DMAC activating unit.

FIG. 6 is a flowchart depicting a process for implementing cascade transfer of FIG. 5. First, the CPU 10 sets up information necessary for DMA transfer in the multiple register sets #1-4 in the DMA controller 110 and also registers events in the event registers 172 of the DMAC activating unit 170 (S70). When a buffer empty event in a transfer destination is received, the event monitoring unit 60 activates the DMA controller 110 by setting up a start bit in the control register 122 of the register set #1 (S72). This starts DMA transfer in accordance with the information in the register set #1 (S74). When the DMA transfer is complete, the event monitoring unit 60 receives a DMA transfer completion event (S76). If any of the events in the event registers 172 matches the current event (Y in S78), the event monitoring unit 60 sets up a start bit in the control register of the subsequent register set corresponding to the event (S80).

If the number of data blocks to be transferred continuously is greater than the number of register sets in the DMA controller 110 (in the case of FIG. 4, four), information related to a subsequent data block may be registered in a register set in the DMA controller that becomes empty subsequent to a DMA transfer operation. Alternatively, information related to subsequent data blocks may be registered en bloc in the entire register sets in the DMA controller after four DMA transfer operations.

Figure 7:
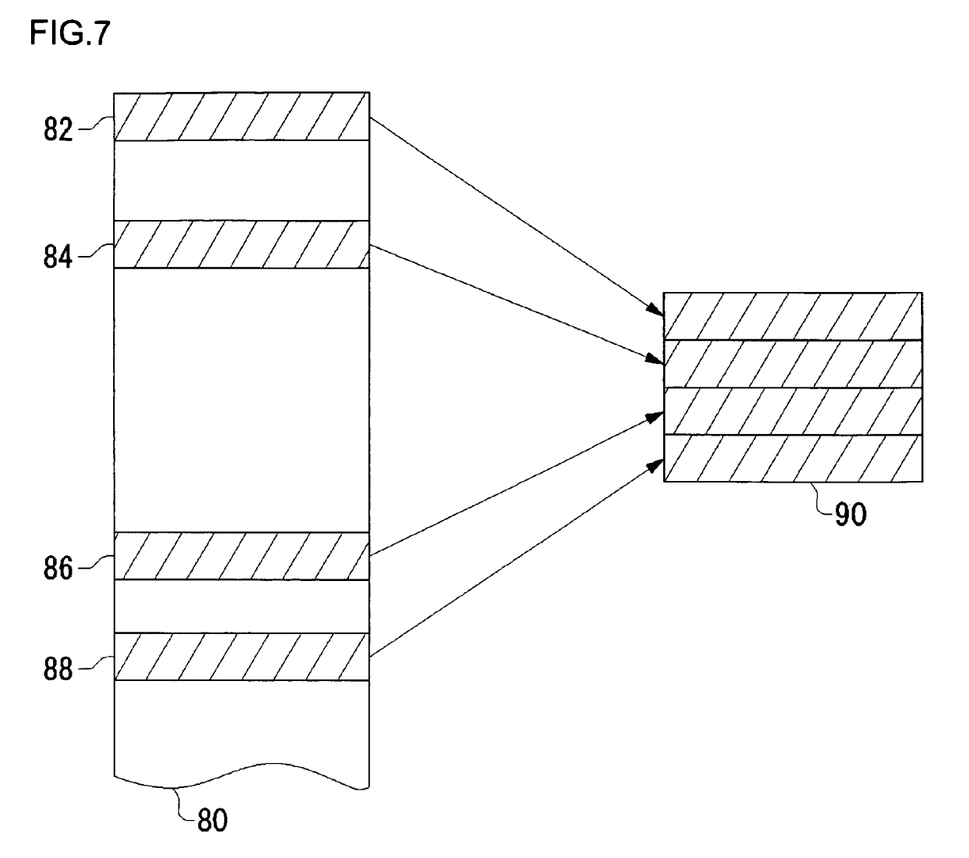
FIG. 7 is a conceptual diagram of block transfer of data.

FIG. 7 is a conceptual diagram showing transfer of non-continuous data in a memory. As explained with reference to FIG. 6, by setting up events in the event registers so that data blocks are linked in a cascade for transfer, data blocks can be transferred to contiguous destinations in a transfer destination device 90 even if data blocks 82-88 in a transfer source device 80 are located in noncontiguous real addresses.

As described above, the second embodiment enables continuous DMA transfer of the same number of data items as the number of register sets without CPU intervention, by providing multiple event registers in a DMAC activating unit and registering DMA transfer completion events in event registers.

In the related art, an interrupt is sent to the CPU each time transfer of a single data block is completed, and addresses and a data size had to be registered in the DMA controller each time. In this process, frequent interrupts need be sent to the CPU. In contrast, this embodiment provides that, by allowing the CPU to register addresses and the like in multiple register sets in the DMA controller prior to the generation of the first event, it is ensured that subsequent completion of transfer of a data block is generated as an event, causing the DMA monitoring unit to activate the DMA controller. Therefore, CPU intervention is not required.

Generally, data transfer between an external storage device and a memory is performed by reading contiguously stored stream data in blocks of a certain size. Therefore, the cascade DMA transfer described above is suitable for continuously transferring stream data such as video data and audio data which are characterized by high bit rate and large data volume.

Third Embodiment

Figure 8:
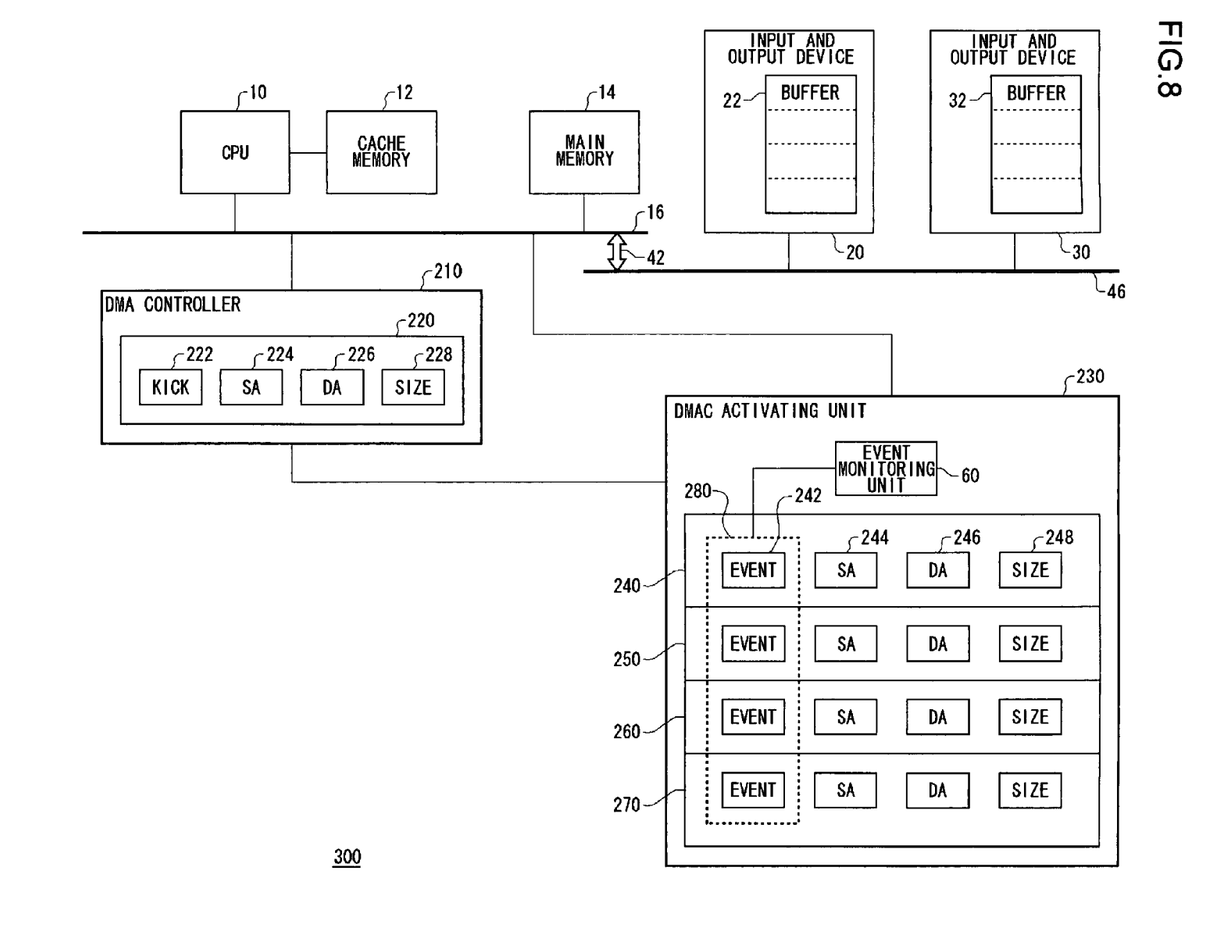
FIG. 8 shows the hardware structure of an information processing system according to a third embodiment of the present invention.

FIG. 3 shows the hardware structure of an information processing system 300 according to a third embodiment. The CPU 10, the cache memory 12, the main memory 14 and the input and output devices 20, 30 respectively have the same functions as those of FIG. 1 so that the description there of is omitted. A DMA controller 210 controls DMA transfer in the information processing system 300. The input and output devices 20, 30 are a transfer source or a transfer destination in DMA transfer.

The DMA controller 210 is at least provided with a first register set 220 comprising a control register 222, a transfer source address register 224, a transfer destination address register 226 and a size register 228. In addition to the event monitoring unit 60, a DMAC activating unit 230 is provided with multiple second register sets each comprising an event register 242, a transfer source address register 244, a transfer destination address register 246 and a size register 248. Referring to FIG. 8, the DMAC activating unit 230 is provided with four second register sets 240, 250, 260 and 270.

The event monitoring unit 60 receives an event notification signal from the input and output devices 20, 30. The event monitoring unit 60 determines whether the received event matches any of events in a set of event registers 280. The event monitoring unit 60 identifies an event register registering the matching event.

The event monitoring unit 60 then writes information in the second register set corresponding to the event register registering the matching event. More specifically, the event monitoring unit 60 writes the transfer source address, transfer destination address and data size, in the corresponding registers of the empty first register set 220 of the DMA controller. Subsequently, the event monitoring unit 60 refers to the information in the first register set and sets up a start bit in the control register 222 so as to perform DMA transfer.

The description of the invention given above is based upon several embodiments. In the related-art DMA controller, interrupts are frequently sent to a CPU as DMA transfer is performed. Each time an interrupt is generated, CPU time is consumed to process the interrupt. In contrast, the present invention provides that, instead of sending a DMA request to the CPU, the event monitoring unit detects an event, and a determination is made as to whether the detected event matches a preset event so as to determine whether to respond to the event. Only when it is determined that the DMA request should be responded to, the DMA controller is activated in accordance with a condition set up in the register set. Accordingly, the DMA controller need only stand by for activation. The frequency of interrupts sent to the CPU is reduced. Even when the bus is occupied for DMA transfer, the CPU may continue other tasks using data in the cache memory, depending upon a situation. This will improve processing efficiency of the information processing system as a whole.

The CPU is free from the need to intervene in each occasion of transfer when a data block is transferred to multiple locations, for instance. Thus, processing load on the CPU is reduced.

The description of the invention given above is based upon the embodiments. The description of the embodiments is illustrative in nature and various variations in constituting elements and processes involved are possible. Those skilled in the art would readily appreciate that such variations are also within the scope of the present invention. Some examples of such variations will be described below.

An empty event in the input and output devices may be generated when a buffer of one of the transfer destination device is empty. Alternatively, an empty event may be generated when all of the multiple buffers necessary for continuous transfer are empty. Several methods are available to generate an empty event.

In the described embodiments, the input and output devices are assumed to originate an event notification signal. Alternatively, the event monitoring unit may be configured to monitor events as they are generated in the input and output devices.

In the described embodiments, the DMA controller is activated by setting a start bit in the control register in the DMAC controller. Alternatively, the control register may be absent in the DMA controller so that the DMA monitoring unit may directly activate the DMA controller.

In the described embodiments, the DMA monitoring unit is allowed to respond to only those DMA requests registered in the event registers in advance, and unregistered DMA requests are disregarded. Alternatively, unregistered DMA requests may not merely be disregarded. Instead, unexpected DMA requests may be recorded in the system for use in system error analysis, debugging etc. For this purpose, the DMA activator may be provided with comparators (not shown) each comparing a DMA request that was generated and a registered DMA request, and also provided with a system register (not shown) for registering generation of an unexpected DMA request when the outputs of the comparators are all inactive despite the fact that a DMA request is generated. The CPU may be allowed to read the content of the system register.

Optional combinations of the constituting elements described in the embodiments, and implementations of the present invention in the form of methods, apparatuses, systems, computer programs, recording mediums etc. may also be practiced as additional modes of the present invention. The method depicted in the flowchart encompasses a process in which the steps are performed in parallel or individually as well as a process performed sequentially in the illustrated order.

If the series of steps of the invention are to be executed by software, the execution may be achieved by operating a computer in which programs constituting the software are built in dedicated hardware. Alternatively, the execution may be achieved by installing the software in a general-purpose computer from a network or a recording medium, wherein the computer is capable of running various functions by installing various programs in the computer.

What is claimed is:

1. An activator, comprising an event register in which an event requests that a direct memory access controller, which is connected to the activator, perform a direct memory access transfer, the event being among a set of events generated by a peripheral device on a computer system, the event being registered beforehand in the event register as second information by a CPU (central processing unit) of a computer system, wherein the direct memory access controller has a set of DMA controller registers storing first information for performing a direct memory access transfer, set by the CPU before the event is generated, and wherein the activator acquires an event generated by the peripheral device on the computer system, compares the acquired event with the event registered beforehand in the event register, and activates the direct memory access controller to perform data transfer between the peripheral device and a storage device by referring to the first information stored on the DMA controller register of the direct memory access controller that is associated with the second information in the event register when the two events match but does not activate the direct memory access controller when the two events do not match.

2. The activator according to claim 1, capable of registering a plurality of events subject to comparison.

3. A direct memory access transfer system comprising:
a direct memory access controller that controls direct memory access transfer in a computer system, wherein the direct memory access controller has a set of DMA controller registers storing first information for performing a direct memory access transfer, set by a CPU of a computer system before an event is generated;
a peripheral device that is a transfer source or a transfer destination in direct memory access transfer and that requests a direct memory access transfer; and
an activator, wherein the activator comprises:
an event register in which an event requests a direct memory access transfer to be performed by a direct memory access controller, which is connected to the activator, the event being among a set of events generated by a peripheral device on a computer system, the event being registered beforehand in the event register as second information by the CPU of the computer system;
an event monitoring unit that detects an event generated by the peripheral device, determines whether the detected event matches the event registered beforehand in the event register, and activates the direct memory access controller to perform data transfer between the peripheral device and a storage device by referring to the first information stored on the DMA controller register of the direct memory access controller that is associated with the second information in the event register when the two events match, but does not activate the direct memory access controller when the two events do not match, and wherein
the direct memory access controller performs the direct memory access transfer based on the first information in the set of DMA controller registers.

4. The direct memory access transfer system according to claim 3, comprising a plurality of peripheral devices having different functions, wherein
the activator comprises two or more event registers capable of registering events related to the respective peripheral devices that are different from each other, and
the event monitoring unit determines whether the detected event matches an event registered in one of the event registers and activates the direct memory access controller by referring to the first information stored on the DMA controller register of the direct memory access controller that is associated with the second information in the event register so as to perform a direct memory access transfer related to the peripheral device corresponding to the matching event.

5. The direct memory access transfer system according to claim 3, wherein the peripheral device communicates a direct memory access transfer completion event controlled by the direct memory access controller to the event monitoring unit.

6. The direct memory access transfer system according to claim 5, wherein information related to a data block to be transferred continuously is written in a DMA controller register of the direct memory access controller as a target of a direct memory access transfer as part of the first information, and wherein completion of the direct memory access transfer of a given data block is registered in the event register of the activator as part of the second information as an event for activating the direct memory access transfer of a subsequent data block.

7. The direct memory access system according to claim 3, wherein the event monitoring unit detects an event in the peripheral device via a dedicated line connecting the peripheral device to the activator.

8. The direct memory access system according to claim 3, wherein the event monitoring unit detects an event in the peripheral device by receiving via a bus an event notification signal that differs from one peripheral device to another.

9. A direct memory access transfer method for continuous direct memory access transfer of a plurality of data blocks related to each other, comprising:
storing first information that is needed to perform a direct memory access transfer of each data block of the plurality of data blocks in a plurality of DMA controller registers of a direct memory access controller, which controls data transfer between a peripheral device and a storage device ;
registering as second information, in an event register within an activator that is connected to the direct memory access controller, the completion of a direct memory access transfer of a data block activated in response to the generation of a first event generated by a computer system, as a second event for activating the direct memory access transfer of a subsequent data block to be continuously transferred, the event register in which an event for requesting a direct memory access transfer, the event being among a set of events generated by a peripheral device on the computer system, being registered;
acquiring by the activator, an event generated in the computer system;
comparing the acquired event with the second event registered in the event register; and
activating the direct memory access controller to begin direct memory access transfer of the data block corresponding to the first event when the two events match by referring to the first information stored on the DMA controller register of the direct memory access controller that is associated with the second information in the event register, but not activating the direct memory access controller when the two events do not match.

10. A direct memory access transfer system comprising:
a direct memory access controller that is provided with two or more DMA controller register sets, each comprising a plurality of DMA controller registers for storing first information for performing a direct memory access transfer, and that controls direct memory access transfer in a computer system, wherein the first information stored in each DMA controller register is set by a CPU of a computer system before an event is generated;
a peripheral device that is a transfer source or a transfer destination in the direct memory access transfer and that requests a direct memory access transfer; and
an activator that is provided with a plurality of event registers associated with the plurality of DMA controller register sets in the direct memory access controller, each event register storing second information of an event for requesting direct memory access transfer, the event being among a set of events generated by a peripheral device on the computer system, and that determines whether to activate the direct memory access controller by detecting an event generated by the peripheral device, wherein
when the detected event matches any of the events stored in the event registers, the activator activates the direct memory access controller to perform direct memory access transfer based on the first information in the DMA controller register set that is associated with the second information in an event register storing the matched event, and wherein when the two events do not match, the direct memory access controller is not activated.

11. A direct memory access system comprising:

a direct memory access controller which is provided with at least a first register set comprising a plurality of registers for storing first information for performing direct memory access transfer and which controls direct memory access transfer in a computer system;

a peripheral device which is a transfer source or a transfer destination in direct memory access transfer and which requests direct memory access transfer; and an activator which determines whether to activate the direct memory access controller by detecting an event generated by the peripheral device, wherein the activator is provided with at least two second register sets each comprising an event register for registering an event for allowing direct memory access transfer, the event being among a set of events generated by a peripheral device on a computer system and a plurality of registers storing second information for performing direct memory access transfer associated with the event register, the second information being set in the plurality of registers by the CPU of the computer system before an event is generated, and wherein when the detected event matches one of the events registered in the event registers, the activator writes, into the first register set in the direct memory controller, the second information stored in the second register set corresponding to the event register registering the matching event, the activator then activating the direct memory access controller by referring to the second information written in the first register set and to perform direct memory access transfer, but not activating the direct memory access controller when the two events do not match.

12. A direct memory access transfer method adapted for a direct memory access transfer system for performing direct memory access transfer between a peripheral device and a storage device without the intervention of a central processing unit, the method comprising:

registering an event for allowing a direct memory access transfer, the event being among a set of events generated by a peripheral device on a computer system, as second information in an event register of an activator;

storing first information needed to perform the direct memory access transfer in a set of DMA controller registers of a direct memory access controller, which controls data transfer between the peripheral device and the storage device, before the event is generated;

detecting an event generated by the peripheral device by the activator;

determining whether the detected event matches an event registered in the event register; and activating a direct memory access controller to perform the direct memory access transfer based on the first information in the set of DMA controller registers when the two events match by referring to the first information stored on the DMA controller register of the direct memory access controller that is associated with the second information in the event register, but not activating the direct memory access controller when the two events do not match.

13. A computer readable recording medium for storing a program adapted to a direct memory access transfer system for performing direct memory access transfer between a peripheral device and a storage device without the intervention of a central processing unit, the program allowing a computer to perform the process of activating a direct memory access controller for controlling direct memory access transfer, the program comprising:

registering an event for allowing a direct memory access transfer, the event being among a set of events generated by a peripheral device on a computer system, as second information in an event register of an activator;

storing first information needed to perform the direct memory access transfer in a set of DMA controller registers of a direct memory access controller, which controls data transfer between the peripheral device and the storage device before the event is generated;

detecting an event generated by the peripheral device by the activator;

determining whether the detected event matches an event registered in the event register; and activating the direct memory access controller to perform the direct memory access transfer based on the information in the set of DMA controller registers when the two events match by referring to the first information stored on the DMA controller registers of the direct memory access controller that are associated with the second information in the event register, but not activating the direct memory access controller when the two events do not match.

* * * * *